(12) United States Patent
Hisashuku et al.

(10) Patent No.: US 11,530,309 B2
(45) Date of Patent: Dec. 20, 2022

(54) FOAMED RESIN MOLDED ARTICLE

(71) Applicant: SEKISUI CHEMICAL CO., LTD., Osaka (JP)

(72) Inventors: Daiki Hisashuku, Kofu (JP); Tamotsu Matsunaga, Shunan (JP); Hiroaki Hanaki, Ritto (JP)

(73) Assignee: SEKISUI CHEMICAL CO., LTD., Osaka (JP)

( * ) Notice: Subject to any disclaimer, the term of this patent is extended or adjusted under 35 U.S.C. 154(b) by 0 days.

(21) Appl. No.: 16/650,164

(22) PCT Filed: Sep. 27, 2018

(86) PCT No.: PCT/JP2018/035921
§ 371 (c)(1),
(2) Date: Mar. 24, 2020

(87) PCT Pub. No.: WO2019/065834
PCT Pub. Date: Apr. 4, 2019

(65) Prior Publication Data
US 2021/0198443 A1 Jul. 1, 2021

(30) Foreign Application Priority Data
Sep. 29, 2017 (JP) .............................. JP2017-189562

(51) Int. Cl.
*C08J 9/10* (2006.01)
*B32B 5/18* (2006.01)
(Continued)

(52) U.S. Cl.
CPC ................ *C08J 9/103* (2013.01); *B32B 5/18* (2013.01); *B32B 25/045* (2013.01);
(Continued)

(58) Field of Classification Search
CPC ....... B32B 27/308; B32B 5/18; B32B 25/045; B32B 27/065; C08J 9/103; C08J 2309/06; C08J 2433/12
See application file for complete search history.

(56) References Cited

U.S. PATENT DOCUMENTS 3,833,688 A    9/1974  Abolins et al.
4,322,260 A *  3/1982  Conlon ................... B29C 44/22
                                                156/244.12
(Continued)

FOREIGN PATENT DOCUMENTS

CN    1099775    3/1995
CN    1986635    6/2007
(Continued)

OTHER PUBLICATIONS

Notice of Reasons for Cancellation dated Nov. 10, 2020 in corresponding Japanese Application No. 2019-524297, with Machine translation.
(Continued)

*Primary Examiner* — Hai Vo
(74) *Attorney, Agent, or Firm* — Wenderoth, Lind & Ponack, L.L.P.

(57) ABSTRACT

A foamed resin molded article (1) including: a foamed resin layer (30) comprising a first resin which is a copolymer including a rubber component, a vinyl cyanide monomer unit and an aromatic vinyl monomer unit, and a blowing agent; and a non-foamed resin layer (50) covering the foamed resin layer (30), wherein: the non-foamed resin layer (50) comprises a second resin which is a copolymer including a rubber component, a vinyl cyanide monomer unit, and an aromatic vinyl monomer unit; and the amount of the rubber component in the non-foamed resin layer (50), determined by pyrolysis-gas chromatography/mass spectrometry
(Continued)

(PGC/MS), is 1% by mass or more and 30% by mass or less, based on the total mass of the second resin.

3 Claims, 3 Drawing Sheets

(51) Int. Cl.
*B32B 25/04* (2006.01)
*B32B 27/06* (2006.01)
*B32B 27/30* (2006.01)
*F16L 59/22* (2006.01)

(52) U.S. Cl.
CPC .......... *B32B 27/065* (2013.01); *B32B 27/302* (2013.01); *B32B 27/308* (2013.01); *F16L 59/22* (2013.01); *B32B 2250/02* (2013.01); *B32B 2250/24* (2013.01); *B32B 2266/0207* (2013.01); *B32B 2266/0228* (2013.01); *B32B 2307/304* (2013.01); *B32B 2307/412* (2013.01); *B32B 2597/00* (2013.01); *C08J 2203/04* (2013.01); *C08J 2309/06* (2013.01); *C08J 2333/12* (2013.01); *C08J 2409/06* (2013.01); *C08J 2433/12* (2013.01)

(56) References Cited

U.S. PATENT DOCUMENTS

| | | | | |
|---|---|---|---|---|
| 4,440,825 | A | * | 4/1984 | Paddock ............ B32B 25/08 428/318.6 |
| 2006/0249216 | A1 | * | 11/2006 | Sexton ............ B29C 45/1642 138/141 |
| 2017/0335088 | A1 | | 11/2017 | Noguchi et al. |

FOREIGN PATENT DOCUMENTS

| | | |
|---|---|---|
| CN | 101058624 | 10/2007 |
| JP | 47-031420 | 8/1972 |
| JP | 48-47943 | 7/1973 |
| JP | 49-015796 | 2/1974 |
| JP | 49-052852 | 5/1974 |
| JP | 55-009412 | 3/1980 |
| JP | 62-45639 | 2/1987 |
| JP | 5-202275 | 8/1993 |
| JP | 10-025361 | 1/1998 |
| JP | 11-49828 | 2/1999 |
| JP | 2002-194108 | 7/2002 |
| JP | 3374947 | 2/2003 |
| JP | 2005-113419 | 4/2005 |
| JP | 3699579 | 9/2005 |
| JP | 2005-298776 | 10/2005 |
| JP | 2007-198534 | 8/2007 |
| JP | 2007-333067 | 12/2007 |
| JP | 2010-116478 | 5/2010 |
| JP | 2011-002012 | 1/2011 |
| JP | 2012-107669 | 6/2012 |
| JP | 2017-155868 | 9/2017 |
| WO | 2016/068303 | 5/2016 |

OTHER PUBLICATIONS

International Search Report dated Dec. 25, 2018 in International (PCT) Application No. PCT/JP2018/035921.
Notice of Reasons for Rejection dated Jun. 11, 2019 in corresponding Japanese Application No. 2019-524297, with English translation.
Sekisui Chemical Co., Ltd., "General Catalog of Eslon Pipes for Building Piping, Japan", Sekisui Chemical Co., Ltd., May 2013, 29th revision, 5th print, pp. 21 to 23.
"Practical Encyclopedia of Plastics", Sangyo Chosakai, Jan. 5, 1994, pp. 96-97, 102-105, with Partial Translation.
"Encyclopedia of Plastics and Functional Polymers", Sangyo Chosakai, Aug. 1, 2005, pp. 110-113, with Partial Translation.
Akio Morimoto, "Acrylonitrile butadiene styrene (ABS) and its manufacturing method", Nippon Gomu Kyokaishi, 1972, vol. 45, No. 6, pp. 570-574, with Partial Translation.
"Acrylonitrile butadiene styrene (ABS)", The Society of Polymer Science, Japan, Aug. 31, 1970, pp. 1-11, 20-23, 26-45, 82-89, 92-99, 120-123, 261-281, 320-321, 352-353, 370-371, 414-415, 430-433, 502, with Partial Translation.
"Engineering plastics—The explanation and physical property table—", The Chemical Daily Co. Ltd., Mar. 15, 1983, pp. 325-331, with Partial Translation.
Sekisui Chemical Co., Ltd., General Catalog of Eslon Pipes for Building Piping, Japan, Sekisui Chemical Co., Ltd., May 2016, 33th revision, pp. 21-22, with Partial Translation.
Office Action dated Jul. 20, 2021 in corresponding Chinese Patent Application No. 201880062617.2, with English translation.
Edited by Kimimasa Ito, "Plastic Data Handbook", Kogyo Chosakai Publishing Co., Ltd., Jul. 1, 1980, p. 3, p. 17, cited in the Written Argument (CB).
Written Argument dated May 28, 2021 in Japanese Patent Application No. 2020-700177 (2019-524297), with partial English Translation.
Notification of Third Party Submission issued Nov. 2, 2021, in Japanese Patent Application No. 2019-154799, with English translation.
"Eslon AC drain joint", Catalog of Sekisui Chemical Co., Ltd., revised in Jan. 2014. Cited in Notification of Third Party Submission.
Office Action dated Aug. 30, 2022, in corresponding Japanese Patent Application No. 2019-154799, with English translation.

* cited by examiner

FOAMED RESIN MOLDED ARTICLE

TECHNICAL FIELD

The present invention relates to a foamed resin molded article used for connecting drainpipes or the like.

Priority is claimed on Japanese Patent Application No. 2017-189562, filed Sep. 29, 2017, the contents of which are incorporated herein by reference.

BACKGROUND ART

Conventionally, it has been general practice to cover exterior of pipes made of steel or a synthetic resin with a heat insulating material such as glass wool, to thereby prevent moisture condensation or the like from occurring on the pipes.

However, such conventional method requires labor for winding or covering the heat insulating material as well as labor for piping. Therefore, the labor efficiency of the method is poor, and a narrow work space in some cases does not allow the necessary operation to be implemented.

For addressing the problem, resin pipes and resin pipe joints that have a foamed resin layer serving as a heat insulating layer have been proposed. The heat insulating layer enables prevention of dew condensation even if the pipes are not covered with a heat insulating material after the implementation of piping.

Patent document 1 proposes a pipe joint with a heat-insulating layer, which has a heat-insulating layer made of a foamed resin inside its main body, and has a configuration in which inner and outer walls of the main body surrounding the heat-insulating layer and a connecting portion are integrally formed by injection molding. As the resin that can be used for the pipe joint of Patent Document 1, polyvinyl chloride, acrylonitrile-butadiene-styrene copolymer (ABS resin), polyethylene, and polypropylene are listed. Further, the current products use an ABS resin that is excellent in impact resistance and heat resistance.

DESCRIPTION OF PRIOR ART

Patent Document

Patent Document 1: Japanese Patent Granted Publication No. 3699579

DISCLOSURE OF INVENTION

Problems to be Solved by the Invention

ABS resins are excellent in impact resistance and heat resistance as initial performance, but are inferior in chemical resistance. Therefore, when an organic solvent or oil is present in a drain pipe, a joint made of ABS resin may deteriorate at inner and outer walls of its main body, resulting in inferior heat insulation.

For addressing this problem, the object of the present invention is to provide a foamed resin molded article which is excellent in heat insulation and chemical resistance.

Means to Solve the Problems

As a result of intensive studies, the present inventors have found that chemical resistance of a foamed resin molded article can be improved by reducing the amount of a rubber component such as butadiene contained in an ABS resin or the like used in the foamed resin molded article.

In addition, the present inventors also found that incorporation of an acrylic resin can make a foamed resin molded product transparent, which allows for easy visual observation of connection between a pipe and a pipe joint.

Embodiments of the present invention made in order to solve the above-mentioned problem are as enumerated below.

[1] A foamed resin molded article including: a foamed resin layer including a first resin which is a copolymer including a rubber component, a vinyl cyanide monomer unit and an aromatic vinyl monomer unit, and a blowing agent; and a non-foamed resin layer covering the foamed resin layer, wherein:

the non-foamed resin layer includes a second resin which is a copolymer including a rubber component, a vinyl cyanide monomer unit, and an aromatic vinyl monomer unit; and the amount of the rubber component in the non-foamed resin layer, determined by pyrolysis-gas chromatography/mass spectrometry (PGC/MS), is 1% by mass or more and 30% by mass or less, based on the total mass of the second resin.

[2] The foamed resin molded article according to [1], wherein the non-foamed resin layer further includes an acrylic resin.

Effect of the Invention

The foamed resin molded article of the present invention is excellent in heat insulation and chemical resistance.

DESCRIPTION OF THE EMBODIMENTS

[Foamed Resin Molded Article]

Hereinbelow, the foamed resin molded article according to one embodiment of the present invention is described with reference to the drawings.

Figure 1:
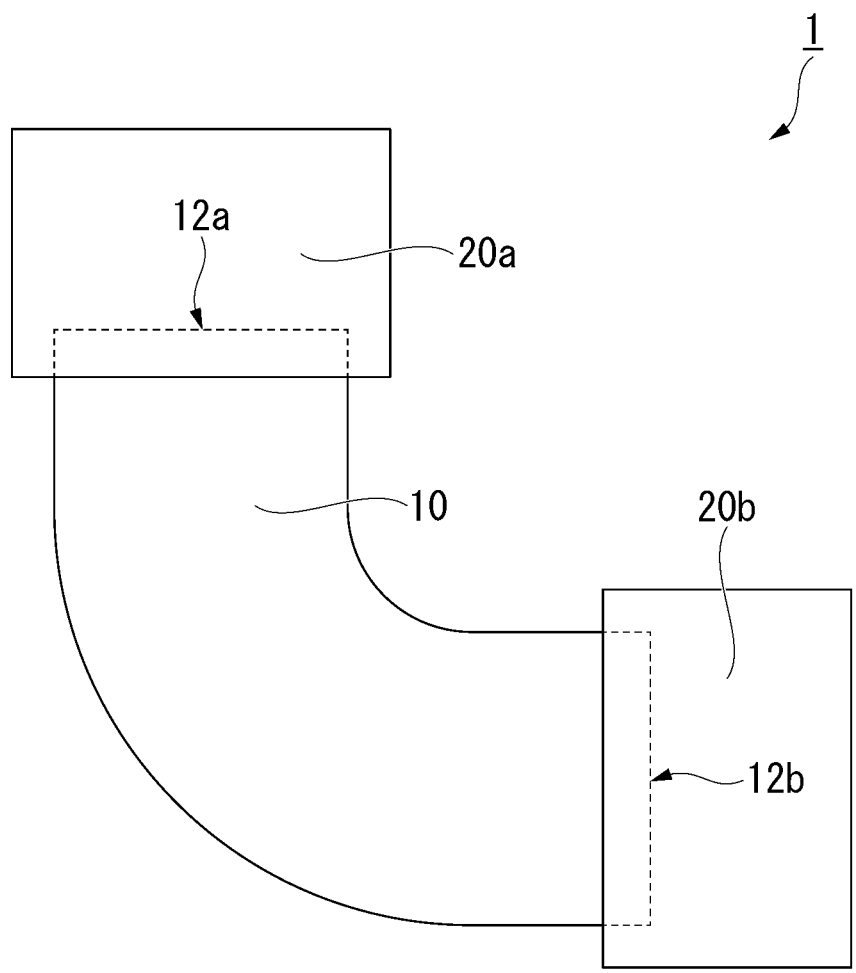
FIG. 1 is a side view showing a foamed resin molded article according to one embodiment of the present invention.

FIG. 1 shows a joint (L-shaped pipe joint generally referred to as "elbow") used for joining drain pipes, as one example of the foamed resin molded article 1 according to the present embodiment. The foamed resin molded article 1 includes a main body 10 that has a bent flow path inside, and an opening 12a and an opening 12b at both ends. The foamed resin molded article 1 includes a cylindrical socket section 20a surrounding the periphery of the opening 12a of the main body 10, and a cylindrical socket section 20b surrounding the periphery of the opening 12b of the main body 10. The main body 10, the socket section 20a and the socket section 20b are integrally formed.

Figure 2:
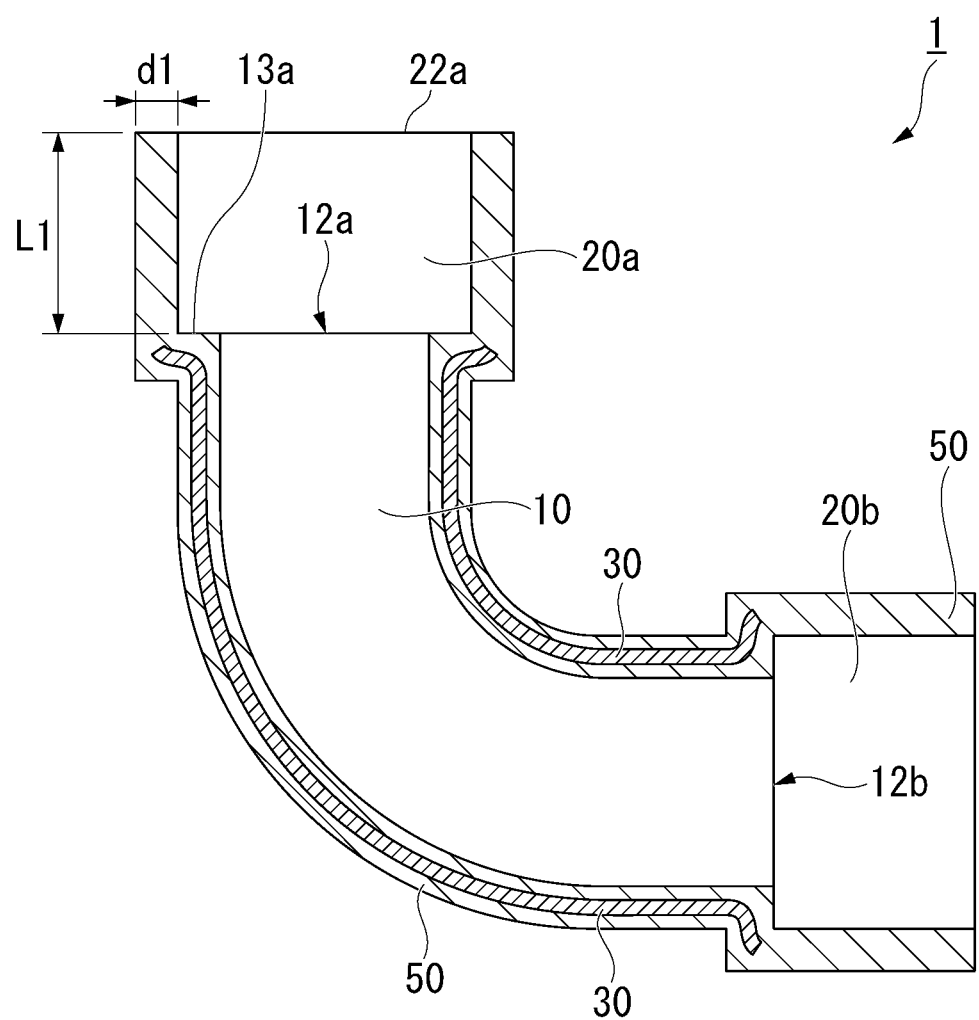
FIG. 2 is a longitudinal sectional view of the foamed resin molded article shown in FIG. 1.

FIG. 2 is a longitudinal sectional view of the foamed resin molded article shown in FIG. 1. As shown in FIG. 2, the main body 10 includes a foamed resin layer 30 and a non-foamed resin layer 50. Both surfaces of the foamed resin layer 30 are covered with the non-foamed resin layer 50. The socket section 20a and the socket section 20b are formed of the non-foamed resin layer 50. A part of the foamed resin layer 30 reaches into the non-foamed resin layer 50 of the socket section 20a. Similarly, a part of the foamed resin layer 30 reaches into the non-foamed resin layer 50 of the socket section 20b.

A stopper 13a is formed on the periphery of the opening 12a of the main body 10. The length from the socket end 22a of the socket section 20a to the stopper 13a is L1.

The thickness of the socket section 20a in the proximity of the stopper 13a is d1.

The structure of the socket section 20b is the same as the structure of the socket section 20a.

Figure 3:
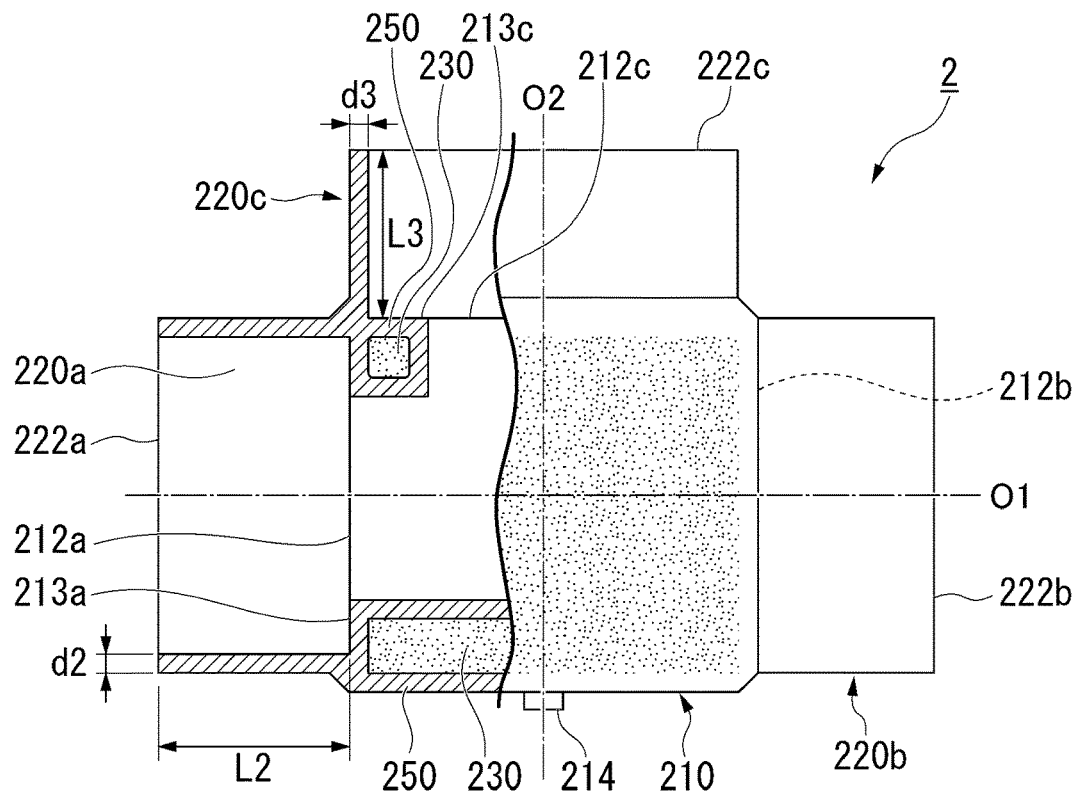
FIG. 3 is a partial cross-sectional view showing a foamed resin molded article according to another embodiment of the present invention.

The foamed resin molded article according to one embodiment of the present invention may be a joint as shown in FIG. 3 (a T-shaped three-way pipe joint generally referred to as "tees").

As shown in FIG. 3, the foamed resin molded article 2 has a first tube axis O1 and a second tube axis O2. The two tube axes O1 and O2 are straight and intersect with each other at an angle of 90.0° to 91.1°.

The foamed resin molded article 2 includes a tubular main body 210 having a flow path (for example, a drain flow path) therein, and three socket sections 220a, 220b, and 220c formed integrally with the main body 210 at the openings thereof. The inner diameters of the three socket sections 220a. 220b, and 220c are larger than the inner diameter of the main body 210 such that tubes having a foam layer can be inserted into and joined at the socket sections.

The foamed resin molded article 2 takes the form of a tees in which socket sections 220a, 220b and 220c are provided at three openings, namely, both ends 212a and 212b of a main body portion 210 that forms a straight pipe and a branch end portion 212c that opens in the direction of the second tube axis O2.

In the main body 210, an injection gate portion 214 is positioned facing the branch end 212c across the first tube axis O1. During molding, the injection is implemented through this injection gate portion 214.

A stopper 213a is formed on the periphery of the opening end 212a of the main body 210, and is connected to the inner peripheral surface of the main body 210. A stopper 213c is formed on the periphery of the branch end 212c of the main body 210.

The main body 210 includes a foamed resin layer 230 and a non-foamed resin layer 250. Both surfaces of the foamed resin layer 230 are covered with the non-foamed resin layer 250. The socket section 220a, the socket section 220b, and the socket section 220c are formed of the non-foamed resin layer 250.

The length from the socket end 222a of the socket section 220a to the opening end 212a of the main body 210 is L2. The length L2 is equal to the length from the socket end 222a to the stopper 213a. The thickness of the socket section 220a in the proximity of the stopper 213a is d2. The structure of the socket section 220b is the same as the structure of the socket section 220a. That is, the length from the socket end 222b to the opening end 212b is L2.

The length from the socket end 222c of the socket section 220c to the branch end 212c of the main body 210 is L3. The length L3 is equal to the length from the socket end 222c to the stopper 213c. The thickness of the socket section 220c in the proximity of the stopper 213c is d3.

<Foamed Resin Layer>

The foamed resin layer 30 is formed by foaming and molding a foamable resin composition. The foamed resin layer 30 imparts excellent heat insulation to the foamed resin molded article 1 of the present invention.

The expansion ratio of the foamed resin layer 30 is preferably 1.0 times or more and 8.0 times or less, more preferably 1.1 times or more and 5.0 times or less, and even more preferably 1.2 times or more and 3.0 times or less.

With the expansion ratio being adjusted within the above range, high heat insulating performance can be imparted to the foamed resin molded article.

The expansion ratio can be adjusted by the type or amount of the resin, the type or amount of the blowing agent, the production conditions, and the like.

The expansion ratio can be measured by the following method.

(Method of Measuring Expansion Ratio)

From the main body 10 of the foamed resin molded article 1, a piece thereof is cut out by cutting 10 mm or more of the main body 10 in its circumferential direction and 50 mm thereof in its axial direction. From the obtained piece, the non-foamed resin layer 50 is cut away with a milling machine, and the resulting foamed resin layer 30 only is processed into a plate having a length of about 50 mm, which is used as a test piece. In this process, four test pieces are to be obtained from the main body 10 at respective positions with their centers positioned on equally quartered points in the circumferential direction of the main body 10.

Following the prescription of JIS K 7122, the apparent density of the test piece is determined at 23° C.±2° C. using a water substitution type specific gravity meter to three decimal places, and the expansion ratio is calculated by the following equation (1).

$$m = \gamma c/\gamma \quad (1)$$

wherein m is an expansion ratio, $\gamma$ is an apparent density of the foamed resin layer (g/cm$^3$), and $\gamma c$ is a density of the foamed resin layer when it is not foamed (g/cm$^3$). The pre-foaming density of the foamed resin layer can be measured from the melted foamed resin layer.

In the foamed resin layer 30, a plurality of cells are formed with substantially no pores in the cell walls thereof, and at least a part of the cells are closed cells not communicating with each other. The closed cell ratio is preferably 85% or more, and more preferably 90% or more. The upper limit is not particularly limited, but is 99% or less from a practical point of view. When the closed cell ratio is within the above range, a low thermal conductivity can be maintained for a long time, and a further improved heat insulation can be achieved.

The closed cell ratio is measured in accordance with JIS K 7138:2006.

<Foamable Resin Composition>

The foamable resin composition of the present embodiment includes a first resin which is a copolymer including a rubber component, a vinyl cyanide monomer unit, and an aromatic vinyl monomer unit, and a blowing agent.

In the present specification, the "unit" refers to a structure derived from a monomeric compound (monomer) before polymerization. For example, the "vinyl cyanide monomer unit" refers to a structure in a polymer, which is derived from a vinyl cyanide monomer (acrylonitrile). The amount (ratio) of each monomer unit in the polymer corresponds to the amount (ratio) of the monomer in a monomer mixture used for producing the polymer.

Further, "(meth) acryl" refers to one or both of "acryl" and "methacryl", and "acrylonitrile" refers to one or both of "acrylonitrile" and "methacrylonitrile".

(First Resin)

The first resin is a copolymer including a rubber component, a vinyl cyanide monomer unit and an aromatic vinyl monomer unit.

The copolymer including a rubber component, a vinyl cyanide monomer unit and an aromatic vinyl monomer unit is a resin obtained by polymerizing an aromatic vinyl monomer and a vinyl cyanide monomer in the presence of a rubber component.

In the present specification, the "rubber component" refers to a monomer component which is a raw material of a diene rubber such as polybutadiene or polyisoprene or a raw material of an acrylic rubber.

Examples of the rubber component in the case of diene rubbers include butadiene, isoprene, and ethylene; and examples in the case of acrylic rubbers include acrylate monomers such as ethyl acrylate, butyl acrylate, butoxyethyl acrylate and methoxyethyl acrylate, and polymers thereof.

Examples of the vinyl cyanide monomer include acrylonitrile and methacrylonitrile, of which acrylonitrile is preferable.

Examples of the aromatic vinyl monomer include styrene, α-methylstyrene, β-methylstyrene, 4-methylstyrene, β-bromostyrene and the like, of which styrene and α-methylstyrene are preferable.

Specific examples of the first resin include an acrylonitrile-butadiene-styrene copolymer (ABS resin), an acrylonitrile-ethylenepropylenediene-styrene copolymer (AES resin), and an acrylonitrile-acrylic rubber-styrene copolymer (AAS resin). Further, a mixture of any of these copolymers may also be used.

The rubber component content of the first resin is not particularly limited, and is preferably 1% by mass or more and 30% by mass or less, based on the total mass of the first resin.

The amount of the vinyl cyanide monomer unit in the first resin is preferably 10% by mass or more and 50% by mass or less, and more preferably from 15% by mass or more and 45% by mass or less, based on the total mass of the first resin. When the amount of the vinyl cyanide monomer unit is not less than the lower limit described above, the tensile strength can be improved. When the amount of the vinyl cyanide monomer unit is not more than the upper limit described above, the impact strength can be improved.

The amount of the aromatic vinyl monomer unit in the first resin is preferably 15% by mass or more and 60% by mass or less, and more preferably 20% by mass or more and 50% by mass or less, based on the total mass of the first resin. When the amount of the aromatic vinyl monomer unit is not less than the lower limit described above, the indentation hardness can be improved. When the amount of the aromatic vinyl monomer unit is not more than the upper limit described above, the impact strength can be improved.

The first resin may contain an optional monomer unit other than the vinyl cyanide monomer unit and the aromatic vinyl monomer unit. Examples thereof include a polycarbonate resin and a monomer thereof.

The amounts of the components in the first resin can be determined through analysis by way of pyrolysis-gas chromatography/mass spectrometry (PGC/MS). The conditions for measurement by way of PGC/MS are, for example, as shown below.

[Measurement Conditions]

Apparatus

Pyrolysis device: PY-2020iD (Frontier Lab)

Gas chromatograph: GC 2010 (Shimadzu Corporation)

Mass spectrometer: GCMS-QP 2010 (Shimadzu Corporation)

Pyrolysis conditions

Pyrolysis temperature: 550° C.

Interface temperature: 250° C.

Gas chromatograph conditions

Carrier flow rate: 1 mil/min (He)

Split ratio: 100:1

Separation column: DB-1 (1.00 pin, 0.25 mmφ×30 m)

Oven temperature: 40° C. (3 min)-320° C. (10 min)

Mass spectrometry conditions

Interface temperature: 250° C.

Ionization temperature: 220° C.

Mass range: 28-700 m/z

Voltage: 1.2 kV

A method for determining the amounts of the components contained in the first resin by the PGC/MS measurement is explained below.

First, the components constituting the first resin are subjected to pyrolysis-separation by pyrolysis-gas chromatography to obtain a pyrolysis pattern (pyrogram) in which each component is recorded as a peak. Next, for the peaks of the pyrolysis pattern, corresponding components, i.e., acrylonitrile, rubber component, and styrene, are identified by a mass spectrum obtained by a mass spectrometer.

These components, i.e., acrylonitrile, rubber component, and styrene, have different rates of pyrolytic depolymerization (rates at which the polymers are decomposed into monomers). Therefore, the area (X) of each peak in the pyrogram is divided by the depolymerization rate (Y) of corresponding component to obtain a peak area (Z) of the component. The depolymerization rates (Y) of the components are as follows, acrylonitrile: 0.15, rubber component: 0.10, and styrene: 1.0. Further, for example, when an acrylic resin such as polymethyl methacrylate is contained as the other resin, the depolymerization rate of the acrylic resin is 1.0.

Then, the ratio (Z/T) of the peak area (Z) of each component of the pyrolysis pattern to the sum (T) of the peak areas (Z) is defined as the amount (% by mass) of the component in the first resin.

Table 1 shows an example of the amounts of the components determined by the PGC/MS measurement of an acrylonitrile-butadiene-styrene copolymer (ABS resin) that contains an acrylic resin. In Table 1, the term "retention time" means the time at which each component undergoes pyrolysis to produce a peak in a pyrogram. The term "sample amount" is the mass of the ABS resin subjected to the analysis.

TABLE 1

| Retention time (Min) | | Sample amount (mg) | Peak area (X) | Depolymerization rate (Y) | Peak area (Z) | Total (T) of peak areas (Z) | Amount (Z/T) (% by mass) |
|---|---|---|---|---|---|---|---|
| 1.72 | Butadiene rubber (rubber component) | 0.3 | 839816 | 0.10 | 8398160 | 146382962 | 6 |
| 2.42 | Acrylonitrile | 0.3 | 4017763 | 0.15 | 26785087 | 146382962 | 18 |
| 5.64 | Methyl methacrylate | 0.3 | 70155381 | 1.00 | 70155381 | 146382962 | 48 |
| 8.08 | Styrene | 0.3 | 41044334 | 1.00 | 41044334 | 146382962 | 28 |

In the foamable resin composition, the amount of the first resin is preferably 45% by mass or more and 90% by mass or less, and more preferably 50% by mass or more and 85% by mass or less, based on the total mass of the foamable resin composition.

The foamable resin composition of the present embodiment may include a resin other than the first resin.

Examples of the other resin include acrylic resins (e.g., polymethyl acrylate, polyethyl acrylate, polyglycidyl acrylate, polymethyl methacrylate, polyethyl methacrylate, and polyglycidyl methacrylate), polyvinyl resins, polyester resins, polyether resins, polyimide resins and the like. One of these may be used alone, or two or more of these may be used in combination.

In the foamable resin composition, the amount of the first resin is preferably 70% by mass or more and 100% by mass or less, and more preferably 85% by mass or more and 100% by mass or less, based on the total mass of the resin in the foamable resin composition.

(Blowing Agent)

The blowing agent may either be a volatile blowing agent or a decomposable blowing agent.

Examples of the volatile blowing agent include aliphatic hydrocarbons, alicyclic hydrocarbons, halogenated hydrocarbons, ethers, ketones, and the like. Examples of the aliphatic hydrocarbon include propane, butane (normal butane, isobutane) and pentane (normal pentane, isopentane, etc.), and examples of the alicyclic hydrocarbon include cyclopentane and cyclohexane. Examples of the halogenated hydrocarbon include one or more halogenated hydrocarbons such as trichlorofluoromethane, trichlorotrifluoroethane, tetrafluoroethane, chlorodifluoroethane, and difluoroethane. Examples of the ether include dimethyl ether and diethyl ether, and examples of the ketone include acetone and methyl ethyl ketone.

Examples of the decomposable blowing agent include inorganic blowing agent such as sodium bicarbonate (sodium hydrogen carbonate), sodium carbonate, ammonium bicarbonate, ammonium nitrite, azide compounds, and sodium borohydride; and organic blowing agent such as azodicarbonamide, barium azodicarboxylate, and dinitrosopentamethylenetetramine.

In addition, gas such as carbon dioxide, nitrogen, and air may be used as the blowing agent as well.

From the viewpoint of excellent foaming performance, a decomposable blowing agent is preferable, of which sodium bicarbonate and azodicarbonamide are more preferable.

One of these may be used alone, or two or more of these may be used in combination.

The amount of the blowing agent is preferably 0.1 part by mass or more and 8 parts by mass or less, more preferably 1 part by mass or more and 5 parts by mass or less, and even more preferably 1 part by mass or more and 3 parts by mass or less, with respect to 100 parts by mass of the first resin.

The foamable resin composition of the present invention may contain components (optional components) other than the first resin and the blowing agent as long as the effects of the present invention are not impaired.

The amount of the optional component is preferably 50 pails by mass or less, more preferably 30 parts by mass or less, and still more preferably 20 parts by mass or less, with respect to 100 parts by mass of the first resin.

The foamable resin composition of the present invention may contain the first resin, the blowing agent, and the optional components. The foamable resin composition may be a pre-formed mixture in which all components are mixed in advance of the molding, or may be an in-situ-formed mixture obtained by mixing some or all of the components in a molding machine. The pre-formed mixture obtained by mixing all the components in advance may be in the form of powder or pellets.

<Non-Foamed Resin Layer>

The non-foamed resin layer of the present embodiment is formed by molding a non-foamable resin composition. The presence of non-foamed resin layer can increase the strength of the foamed resin molded article of the present invention. The non-foamed resin layer covers the foamed resin layer.

<Non-Foamable Resin Composition>

The non-foamable resin composition of the present embodiment includes a second resin which is a copolymer including a rubber component, a vinyl cyanide monomer unit, and an aromatic vinyl monomer unit.

(Second Resin)

The second resin is a copolymer including a rubber component, a vinyl cyanide monomer unit, and an aromatic vinyl monomer unit.

The second resin may be the same as or different from the first resin.

The second resin has a rubber component content of 1% by mass or more and 30% by mass or less, preferably 1% by mass or more and 25% by mass or less, more preferably 3% by mass or more and 20% by mass or less, even more preferably 5% by mass or more and 15% by mass or less, and particularly preferably 5% by mass or more and 10% by mass or less, based on the total mass of the second resin. When the rubber component content is not less than the lower limit described above, the strength of the foamed resin molded article can be easily increased. When the rubber component content is not more than the upper limit described above, the chemical resistance of the foamed resin molded article can be more easily improved.

The amount of the vinyl cyanide monomer unit in the second resin is preferably 10% by mass or more and 50% by mass or less, and more preferably from 15% by mass or more and 45% by mass or less, based on the total mass of the second resin. When the amount of the vinyl cyanide monomer unit is not less than the lower limit described above, the tensile strength can be improved. When the amount of the vinyl cyanide monomer unit is not more than the upper limit described above, the impact strength can be improved.

The amount of the aromatic vinyl monomer unit in the second resin is preferably 15% by mass or more and 60% by mass or less, and more preferably 20% by mass or more and 50% by mass or less, based on the total mass of the second resin. When the amount of the aromatic vinyl monomer unit is not less than the lower limit described above, the indentation hardness can be improved. When the amount of the aromatic vinyl monomer unit is not more than the upper limit described above, the impact strength can be improved.

The respective amounts of the components in the second resin can be determined through analysis by way of pyrolysis-gas chromatography/mass spectrometry (PGC/MS). The measurement can be performed under the same conditions as those for the first resin.

In the non-foamable resin composition, the amount of the second resin is preferably 45% by mass or more and 90% by mass or less, and more preferably 50% by mass or more and 85% by mass or less, based on the total mass of the non-foamable resin composition.

The non-foamable resin composition of the present embodiment may include a resin other than the second resin.

Examples of the other resin include polyvinyl resins, polyester resins, polyether resins, acrylic resins, and polyimide resins. One of these may be used alone, or two or more of these may be used in combination.

The non-foamable resin composition of the present embodiment preferably further includes an acrylic resin. Examples of the acrylic resin include an acrylate polymer and a methacrylate polymer. Examples of the acrylate polymer include polymethyl acrylate, polyethyl acrylate, and polyglycidyl acrylate. Examples of the methacrylate polymer include polymethyl methacrylate, polyethyl methacrylate, and polyglycidyl methacrylate.

The amount of the acrylic resin is preferably from 20% by mass to 60% by mass, and more preferably from 30% by mass to 50% by mass, based on the total mass of the resin in the non-foamable resin composition. When the amount of the acrylic resin is within the above range, the strength and the transparency of the foamed resin molded article can be easily increased.

The amount of the acrylic resin is preferably from 10% by mass to 55% by mass, more preferably from 20% by mass to 50% by mass, based on the total mass of the non-foamable resin composition.

The amounts of the components in the non-foamable resin composition including the second resin and the other resin(s) can be determined through analysis by way of pyrolysis-gas chromatography/mass spectrometry (PGC/MS). The measurement can be performed under the same conditions as those for the first resin. The amounts of the components in the second resin can be calculated by the same calculation method as for the components in the first resin.

The depolymerization rates of acrylonitrile, rubber component, styrene, and acrylic resin are as follows: acrylonitrile: 0.15, rubber component: 0.10, styrene: 1.0, and acrylic resin: 1.0.

In the non-foamable resin composition, the amount of the second resin is preferably 40% by mass or more and 100% by mass or less, more preferably 45% by mass or more and 100% by mass or less, and even more preferably 50% by mass or more and 100% by mass or less, based on the total mass of the resin(s) in the non-foamable resin composition.

The non-foamable resin composition of the present embodiment may contain some components (optional components) other than the second resin as long as the effects of the present invention are not impaired.

Examples of the optional components include colorants, flame retardants, antioxidants, ultraviolet absorbers, light stabilizers, and the like.

The amount of the optional component is preferably 50 parts by mass or less, more preferably 30 parts by mass or less, and still more preferably 20 parts by mass or less, with respect to 100 parts by mass of the second resin.

The non-foamed resin layer does not need to contain the blowing agent, but may contain the blowing agent. The amount of the blowing agent contained in the non-foamed resin layer is preferably from 0 part by mass or more and 8 parts by mass or less, more preferably 0 part by mass or more and 5 parts by mass or less, and even more preferably 0 part by mass or more and 3 parts by mass or less, with respect to 100 parts by mass of the second resin. Further, the expansion ratio of the non-foamed resin layer is preferably 0, but the non-foamed resin layer with a low expansion ratio of 1.5 or less is not excluded from the present invention.

The non-foamable resin composition of the present embodiment may include the second resin and optional components. The non-foamable resin composition may be a pre-formed mixture in which all components are mixed in advance of the molding, or may be an in-situ-formed mixture obtained by mixing some or all of the components in a molding machine. The pre-formed mixture obtained by mixing all the components in advance may be in the form of powder or pellets.

The non-foamable resin composition of the present embodiment forms a non-foamed resin layer and covers the outer surface of the foamed resin molded article of the present invention. Further, in the non-foamable resin composition of the present embodiment, the amount of the rubber component in the second resin is 1% by mass or more and 30% by mass or less, based on the total mass of the second resin. Therefore, the non-foamed resin layer has excellent chemical resistance, and the foamed resin molded article of the present invention has excellent chemical resistance.

<Production Method of Foamed Resin Molded Article>

The foamed resin molded article can be manufactured by injection molding or extrusion molding.

For example, a foamed resin molded article having a predetermined expansion ratio can be obtained by a method in which the foamable resin composition is heat-melted and injected into a mold, followed by heating the composition at an arbitrary temperature for an arbitrary time, and then the resulting composition is cooled at an arbitrary temperature for an arbitrary time.

In the case of extrusion molding, the foamable resin composition is foam-molded by a method in which the foamable resin composition is heat-melted, and injected into a mold from an extruder, followed by heating the composition at an arbitrary temperature for an arbitrary time. After cooling at an arbitrary temperature for an arbitrary time, the resulting product is cut into a piece having a predetermined length, thereby obtaining a foamed resin molded article having a predetermined expansion ratio.

In an injection molding machine, the temperature (molding temperature) of the foamable resin composition immediately before being injected into the mold is preferably 200° C. or higher and 280° C. or lower, and more preferably 220°

C. or higher and 260° C. or lower. When the molding temperature is in the above range, the thermal decomposition of the thermoplastic resin that results in decrease in transparency can be prevented, and the thermoplastic resin is sufficiently melted to thereby enable the foamable resin composition to show good fluidity.

The time for molding in a mold is preferably 1 minute or more and 10 minutes or less. When the molding time is not less than the lower limit described above, it is possible to allow the curing to sufficiently proceed, while when the molding time is not more than the upper limit described above, productivity of the foamed resin molded article can be easily improved.

The foamed resin molded article of the present invention has been described above in detail; however, any appropriate modifications can be made as long as such modifications do not deviate from the essence of the present invention.

For example, the foamed resin molded article may not have the non-foamed resin layer, and have only the foamed resin layer. In such a case, the foamed resin layer may have a rubber component content of 1% by mass or more and 30% by mass or less, based on the total mass of the first resin. When the foamed resin molded article is formed only of the foamed resin layer, what is required of the outer surface of the foamed resin layer is to form a high-density layer as in the case of the non-foamed resin layer.

With respect to the layered structure of the foamed resin molded article of the present invention, as long as the molded article has the foamed resin layer, the molded article may be a multilayer molded article having a resin layer(s) other than the foamed resin layer. Examples of the other resin layer(s) besides the non-foamed resin layer include the same foamed resin layer as the outer surface, and a foamed resin layer different from the outer surface. The resin used as the raw material of these resin layers may be the same thermoplastic resin as used in the foamed resin layer forming the outer surface, or may be a different thermoplastic resin. For suppressing the delamination between the resin layers, it is preferable that the resin used as the raw material of these resin layers is the same thermoplastic resin as used in the foamed resin layer forming the outer surface.

When the foamed resin molded article is a foamed pipe joint (elbow) as shown in FIG. 2, the ratio of the length L1 from the socket end 22a of the socket section 20a to the stopper 13a with respect to the thickness d1 of the socket section 20a in the proximity of the stopper 13a (hereinafter, also referred to as "L1/d1 ratio") is preferably 3.5 or more and 10 or less, more preferably 4.0 or more and 9.0 or less, and even more preferably 4.5 or more and 8.0 or less.

When the L1/d1 ratio is not less than the lower limit described above, it is easy to prevent the foamed resin layer 30 from intruding into the socket 20a, and it is easy to suppress a decrease in the strength of the socket 20a. For this reason, the foamed pipe joint is less likely to be broken by expansion/contraction fatigue due to expansion and contraction of the foamed pipe joint. Further, when the L1/d1 ratio is not less than the lower limit described above, the length L1 of the socket section 20a is sufficiently large, so that it is easy to suppress water leakage due to insufficient insertion of a pipe or the like into the foamed pipe joint.

When the L1/d1 ratio is not more than the upper limit described above, the thickness d1 is sufficiently large, so that the foamed pipe joint becomes less likely to be broken by expansion/contraction fatigue resulting from expansion and contraction of the foamed pipe joint. Further, when the L1/d1 ratio is not more than the upper limit described above, the length L1 is not too large, so that it becomes easier to suppress the stress caused by expansion and contraction from being concentrated on the base of the socket section 20a, and the foamed pipe joint becomes less likely to be broken by the expansion/contraction fatigue resulting from expansion and contraction of the foamed pipe joint.

In addition, the L1/d1 ratio is the same in the socket section 20b of the foamed resin molded article 1.

When the foamed resin molded article is a foamed pipe joint (tees) as shown in FIG. 3, the ratio of the length L2 from the socket end 222a of the socket section 220a to the stopper 213a with respect to the thickness d2 of the socket section 220a in the proximity of the stopper 213a (hereinafter, also referred to as "L2/d2 ratio") is the same as the L1/d1 ratio described above.

In addition, the L2/d2 ratio is the same in the socket section 220b of the foamed resin molded article 2.

The ratio of the length L3 from the socket end 222c of the socket section 220c to the stopper 213c and the thickness d3 in the proximity of the stopper 213c of the socket section 220c is the same as the L1/d1 ratio described above.

The foamed resin molded article of the present invention is not limited to the above embodiment, and may be a foamed pipe joint having other shapes than mentioned above, such as a nipple or a valve socket.

Further, the foamed resin molded article is not limited to the foamed pipe joint, and may be a foamed resin lid manufactured by injection molding, a foamed resin pipe manufactured by extrusion molding, or the like.

As described above, the foamed resin molded article of the present invention has a foamed resin layer, which enables the foamed resin molded article to show excellent heat insulation. In addition, the foamed resin molded article of the present invention contains less amount of the rubber component on its outer surface as compared to conventional ABS resins or conventional AES resins. Therefore, the foamed resin molded article of the present invention shows excellent chemical resistance.

EXAMPLES

Hereinbelow, the present invention will be described in more detail with reference to the Examples which, however, should not be construed as limiting the present invention.

The raw materials and evaluation methods used in the Examples and Comparative Examples are as follows.

[Raw Materials]
<First Resin>
ABS resin (butadiene content 15% by mass).
<Second Resin>
ABS resin (ABS resins having respective compositions shown in Tables 2 and 3).
<Other Resin>
Acrylic resin (polymethyl methacrylate).
<Blowing Agent>
ADCA (azodicarbonamide with a trade name "AZ-HM", manufactured by Otsuka Chemical Co., Ltd.)

Examples 1 to 6

A resin composition obtained by kneading polymethyl methacrylate with an ABS resin was used as a non-foamable resin composition. The kneading was implemented with a mixing ratio such that ratios of peak areas ascribed to the respective components determined by PGC measurement of the non-foamable resin composition were as shown in Table 2. A mixture of this non-foamable resin composition and azodicarbonamide as a blowing agent was injection-molded as a foamable resin composition, so as to manufacture a DV joint-type elbow as shown in FIG. 2 having an inner diameter of 30 mm, in which socket sections were solid formed of a non-foamed resin layer, the thickness between the inner and outer wall surfaces of each socket section was 3 mm, the length of each socket section was 23 mm, the thickness between the inner and outer walls of the main body was 8 mm, and the expansion ratio was 2 times.

Example 7

An elbow was manufactured in the same manner as in Example 6, except that the length of each socket section was changed to 13 mm.

Example 8

An elbow was manufactured in the same manner as in Example 1, except that the thickness between the inner and outer wall surfaces of each socket section was changed to 3.2 mm and the length of each socket section was changed to 30 mm.

Example 9

An elbow was manufactured in the same manner as in Example 1 except that the kneading was implemented with a mixing ratio such that ratios of peak areas ascribed to the respective components determined by PGC measurement of the non-foamable resin composition were as shown in Table 3.

Example 101

An elbow was manufactured in the same manner as in Example 1, except that the thickness between the inner and outer wall surfaces of each socket section was changed to 2.6 mm and the length of each socket section was changed to 30 mm.

Example 11

An elbow was manufactured in the same manner as in Example 6, except that the thickness between the inner and outer wall surfaces of each socket section was changed to 5.5 mm and the length of each socket section was changed to 18 mm.

Comparative Examples 1 and 2

An elbow was manufactured in the same manner as in Example 1 except that the ABS resin and the polymethyl methacrylate were kneaded with a mixing ratio such that ratios of peak areas ascribed to the respective components determined by PGC measurement of the non-foamable resin composition were as shown in Table 3.

[Evaluation of Chemical Resistance]

From each of the elbows obtained in the above Examples and Comparative Examples, a dumbbell-shaped test piece was obtained by cutting the socket section thereof in a tube axis direction. The obtained test piece was fixed to a bending jig designed so as to apply a 3 MPa expansion/contraction stress in a room having a temperature of 23° C., and a 10 mm×20 mm cotton having absorbed 2 ml of polyethylene glycol was placed on the center of the test piece. With respect to each of the Examples and Comparative Examples, three test pieces as described above were prepared. The cotton was removed from an arbitrarily selected one of the three test pieces after leaving the test piece to stand for 36 hours, and the test piece was visually checked. The other two of the three test pieces were allowed to stand for 72 hours, whereafter the cotton was removed and the test pieces were visually checked to evaluate the chemical resistance. The chemical resistance was evaluated based on the presence or absence of crack in the test pieces according to the following evaluation criteria. The results are shown in Tables 2 and 3.
(Evaluation criteria)
◯: No breakage or cracking occurred even after 72 hours.
Δ: Breakage and cracking occurred after a mount time of 1 hour to less than 72 hours.
X: Breakage and cracking occurred after a mount time of less than 1 hour.

[Evaluation of Expansion/Contraction Fatigue Resistance]

Figure 4:
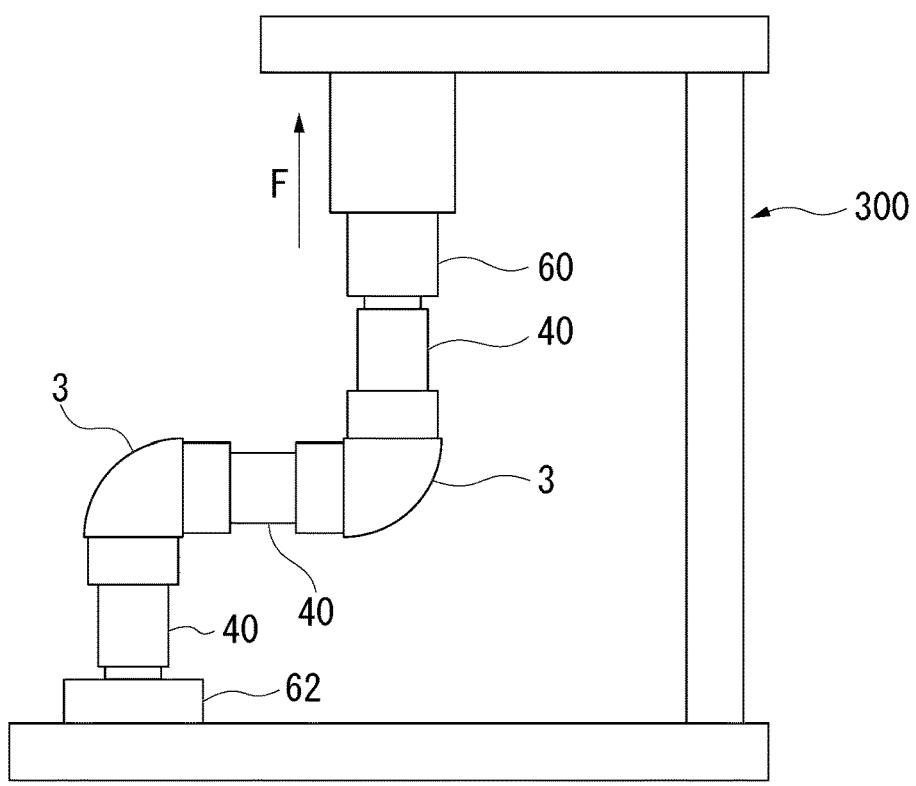
FIG. 4 is a side view showing a piping structure in an expansion/contraction fatigue test.

As shown in FIG. 4, the produced elbow 3 was connected to a pipe 40, and fixed to a fixing jig 60 and a fixing jig 62, using a hydraulic fatigue tester (serial fatigue tester EHF-ED10-70L, manufactured by Shimadzu Corporation) 300. The elbow 3 was pulled upward in the vertical direction while applying a stress F of 700 kg weight (6865 N) once per second to perform an expansion/contraction fatigue test. The expansion/contraction fatigue test was continued until the elbow 3 broke by expansion/contraction or the number of stress F application reached 1000 times, and the number of stress F application until the elbow 3 broke by expansion/contraction was measured. The elbow 3 had the same shape as the foamed resin molded article 1 shown in FIGS. 1 and 2. The expansion/contraction fatigue resistance was evaluated according to the following evaluation criteria. The results are shown in Tables 2 and 3.
(Evaluation criteria)
◯: 1000 times or more
Δ: 200 times or more and less than 1000 times
x: Less than 200 times

TABLE 2

| | | | Ex. 1 | Ex. 2 | Ex. 3 | Ex. 4 | Ex. 5 | Ex. 6 |
|---|---|---|---|---|---|---|---|---|
| Composition of non-foamed resin layer (% by mass) | Second resin | Acrylonitrile | 26 | 23 | 21 | 43 | 38 | 30 |
| | | Butadiene rubber (rubber component) | 10 | 8 | 5 | 10 | 18 | 16 |
| | | Styrene | 29 | 26 | 24 | 47 | 44 | 34 |
| | Other resin | Methyl methacrylate | 35 | 43 | 50 | 0 | 0 | 20 |
| | Total of resin components | | 100 | 100 | 100 | 100 | 100 | 100 |

TABLE 2-continued

|  |  | Ex. 1 | Ex. 2 | Ex. 3 | Ex. 4 | Ex. 5 | Ex. 6 |
|---|---|---|---|---|---|---|---|
| Dimension of socket section | Length L1 of socket section (mm) | 23 | 23 | 23 | 23 | 23 | 23 |
|  | Thickness d1 of socket section (mm) | 3.0 | 3.0 | 3.0 | 3.0 | 3.0 | 3.0 |
|  | L1/d1 ratio | 7.7 | 7.7 | 7.7 | 7.7 | 7.7 | 7.7 |
| Evaluation | Chemical resistance | ○ | ○ | ○ | ○ | Δ | Δ |
|  | Expansion/contraction fatigue resistance | ○ | ○ | ○ | ○ | Δ | Δ |

TABLE 3

|  |  |  | Ex. 7 | Ex. 8 | Ex. 9 | Ex. 10 | Ex. 11 | Comp. Ex. 1 | Comp. Ex. 2 |
|---|---|---|---|---|---|---|---|---|---|
| Composition of non-foamed resin layer (% by mass) | Second resin | Acrylonitrile | 30 | 26 | 37 | 26 | 30 | 33 | 31 |
|  |  | Butadiene rubber (rubber component) | 16 | 10 | 26 | 10 | 16 | 36 | 31 |
|  |  | Styrene | 34 | 29 | 14 | 29 | 34 | 31 | 20 |
|  | Other resin | Methyl methacrylate | 20 | 35 | 23 | 35 | 20 | 0 | 18 |
|  | Total of resin components |  | 100 | 100 | 100 | 100 | 100 | 100 | 100 |
| Dimension of socket section | Length L1 of socket section (mm) |  | 13 | 30 | 23 | 30 | 18 | 23 | 23 |
|  | Thickness d1 of socket section (mm) |  | 3.0 | 3.2 | 3.0 | 2.6 | 5.5 | 3.0 | 3.0 |
|  | L1/d1 ratio |  | 4.3 | 9.4 | 7.7 | 11.5 | 3.3 | 7.7 | 7.7 |
| Evaluation | Chemical resistance |  | Δ | ○ | Δ | ○ | Δ | X | X |
|  | Expansion/contraction fatigue resistance |  | ○ | Δ | Δ | X | X | X | X |

As shown in Tables 2 and 3, in Examples 1 to 4 to which the present invention was applied, the evaluation of the chemical resistance was "○", indicating that the chemical resistance of the molded article was excellent. In addition, the results of the expansion/contraction fatigue test corroborated sufficient strength of the molded article against expansion/contraction in these Examples.

In Examples 5 to 7 and 9 in which the amount of the rubber component (butadiene) in the non-foamed resin layer was 15% by mass or more, it was found that, though inferior to Examples 1 to 4, the molded articles had sufficient chemical resistance and strength.

In Example 8 in which the length of the socket sections was large, it was found that, though inferior to Examples 1 to 4, the molded article had a certain degree of strength.

In Examples 10 and 11, the chemical resistance of the molded articles was sufficient because the amount of the rubber component (butadiene) in the non-foamed resin layer was 30% by mass or less, but the expansion/contraction fatigue resistance of the molded articles was inferior because the L1/d1 ratio was outside the preferable range described above.

On the other hand, in Comparative Examples 1 and 2 in which the amount of the rubber component was outside the range defined in the present invention, the chemical resistance of the molded articles was inferior.

The above results revealed that the foamed resin molded article of the present invention is excellent in heat insulation and chemical resistance.

DESCRIPTION OF THE REFERENCE SIGNS 1, 2 Foamed resin molded article
3 Elbow
10, 210 Main body
12a, 12b Opening
13a, 213a, 213c Stopper
20a, 20b, 220a, 220b, 220c Socket section
22a, 222a, 222b, 222c Socket end
212a, 212b Opening end
212c Branch end
30, 230 Foamed resin layer
50, 250 Non-foamed resin layer
40 Pipe
60, 62 Fixing jig
300 Hydraulic fatigue testing machine

The invention claimed is:
1. A foamed resin molded article comprising:
a foamed resin layer comprising a first resin which is a copolymer including a rubber component, a vinyl cyanide monomer unit and an aromatic vinyl monomer unit, and a blowing agent, and
a non-foamed resin layer covering the foamed resin layer, wherein:
the non-foamed resin layer comprises a second resin which is a copolymer including a rubber component, a vinyl cyanide monomer unit, and an aromatic vinyl monomer unit,
an amount of the rubber component in the non-foamed resin layer, determined by pyrolysis-gas chromatography/mass spectrometry (PGC/MS), is 5% by mass or more and 15% by mass or less, based on a total mass of the second resin;
each of the first resin and the second resin is an acrylonitrile-butadiene-styrene copolymer (ABS resin);
the foamed resin molded article is a joint having a bent flow path inside; and the foamed resin molded article does not break in an expansion/contraction fatigue resistance test under the conditions that a stress F of 700 kg weight is applied once per second for at least 1,000 times.

2. The foamed resin molded article according to claim 1, wherein the non-foamed resin layer further comprises an acrylic resin.

3. The foamed resin molded article according to claim 1, wherein the joint is an L-shaped pipe joint or a T-shaped three-way pipe joint.

* * * * *